US011746955B2

(12) United States Patent
Kim et al.

(10) Patent No.: US 11,746,955 B2
(45) Date of Patent: Sep. 5, 2023

(54) SUPPORT SYSTEM FOR INNER AND OUTER TANK CONNECTION UNIT OF CRYOGENIC FLUID STORAGE TANK, AND CRYOGENIC FLUID STORAGE TANK USING SAME

(71) Applicants: HYLIUM INDUSTRIES, INC., Seongnam-si (KR); KOREA INSTITUTE OF OCEAN SCIENCE TECHNOLOGY, Busan (KR)

(72) Inventors: Do Hyung Kim, Hwaseong-si (KR); Stepien Piotr, Osan-si (KR); Soo Yong Song, Wonju-si (KR); Dong Yeong Jeong, Suwon-si (KR); Dong Hee Hong, Seongnam-si (KR); Seo Young Kim, Yongin-si (KR); Hyun Suk Kim, Sejong (KR); Hyun Sung Kim, Daejeon (KR); Byoung Jae Park, Daejeon (KR)

(73) Assignees: HYLIUM INDUSTRIES, INC., Seongnam-si (KR); KOREA INSTITUTE OF OCEAN SCIENCE TECHNOLOGY, Busan (KR)

( * ) Notice: Subject to any disclaimer, the term of this patent is extended or adjusted under 35 U.S.C. 154(b) by 0 days.

(21) Appl. No.: 17/706,610

(22) Filed: Mar. 29, 2022

(65) Prior Publication Data
US 2023/0160526 A1    May 25, 2023

(30) Foreign Application Priority Data

Nov. 24, 2021 (KR) .................. 10-2021-0163796
Feb. 8, 2022 (KR) .................. 10-2022-0015915

(51) Int. Cl.
F17C 1/08    (2006.01)
F17C 1/12    (2006.01)

(52) U.S. Cl.
CPC .............. *F17C 1/08* (2013.01); *F17C 1/12* (2013.01); *F17C 2201/0109* (2013.01);
(Continued)

(58) Field of Classification Search
CPC .... F17C 1/08; F17C 13/08; F16B 7/00; F16B 9/052; F16B 9/05; F16B 9/02
(Continued)

(56) References Cited

U.S. PATENT DOCUMENTS 1,598,149 A  *  8/1926  Mott ................... F17C 13/086
                                                        220/560.1
2,799,425 A  *  7/1957  Werker ................... F17C 3/08
                                                        62/47.1

(Continued)

FOREIGN PATENT DOCUMENTS

KR    10-1744223    6/2017

*Primary Examiner* — Robert J Hicks
(74) *Attorney, Agent, or Firm* — H.C. Park & Associates, PLC

(57) ABSTRACT

A support system for a connection unit for connecting an inner tank and an outer tank of a cryogenic fluid storage tank includes: an inner support formed to surround a part of the connection unit; a head coupled to the inner circumferential surface of a first end portion of the inner support, and formed to comes in contact with an end portion of the connection unit when the connection unit is coupled to the inner support; and an outer support formed to surround the inner support and having a first end portion connected to a second end portion of the inner support, wherein a second end portion of the outer support comes in contact with the inner tank or the outer tank.

14 Claims, 6 Drawing Sheets

(52) U.S. Cl.
CPC .......... *F17C 2203/013* (2013.01); *F17C 2203/0391* (2013.01); *F17C 2203/0629* (2013.01); *F17C 2223/0161* (2013.01); *F17C 2260/033* (2013.01)

(58) Field of Classification Search
USPC .......... 220/581, 560.1, 560.04, 23.4, 23.2, 23.89, 220/23.87, 23.83; 141/35; 403/360, 361, 403/381
See application file for complete search history.

(56) References Cited

U.S. PATENT DOCUMENTS

| | | | | |
|---|---|---|---|---|
| 2,823,822 | A * | 2/1958 | Altman | F17C 13/086 220/560.11 |
| 3,102,655 | A * | 9/1963 | Adkins | A47J 41/028 220/901 |
| 3,487,971 | A * | 1/1970 | Gay | F17C 13/088 62/51.1 |
| 3,631,974 | A * | 1/1972 | Schaefer | F17C 13/084 220/23.6 |
| 5,012,948 | A * | 5/1991 | Van Den Bergh | F17C 13/087 505/892 |
| 8,833,582 | B1 * | 9/2014 | Ellis | B65D 88/027 220/23.4 |
| 2014/0238052 | A1 | 8/2014 | Shin et al. | |

* cited by examiner

SUPPORT SYSTEM FOR INNER AND OUTER TANK CONNECTION UNIT OF CRYOGENIC FLUID STORAGE TANK, AND CRYOGENIC FLUID STORAGE TANK USING SAME

CROSS REFERENCE TO RELATED APPLICATION

This application claims priority from Korean Patent Application Nos. 10-2021-0163796, filed on Nov. 24, 2021, and Korean Patent Application No. 10-2022-0015915, filed on Feb. 8, 2022, which are hereby incorporated by reference for all purposes as if fully set forth herein.

BACKGROUND

Field

Embodiments of the invention relates to a support system for an inner and outer tank connection unit of a cryogenic fluid storage tank and a cryogenic fluid storage tank using the same, and more specifically, to a support system for an inner and outer tank connection unit of a cryogenic fluid storage tank and a cryogenic fluid storage tank using the support system which is disposed on a connection unit connecting an inner tank and an outer tank of a cryogenic fluid storage tank to prevent external heat from being conducted toward the inner tank or to prevent cold air from being conducted from the inner tank to the outside, through the connection unit.

Because energy problems caused by the use of fossil fuel are getting serious, studies on alternative fuel are being actively carried out.

Discussion of the Background

The above information disclosed in this Background section is only for understanding of the background of the inventive concepts, and, therefore, it may contain information that does not constitute prior art. A technical idea of using hydrogen as fuel is in the spotlight as alternative fuel since hydrogen is eco-friendly and has high efficiency, and has a wide utilization range even in small devices such as drones, as well as for use in a vehicle that uses hydrogen rather than gasoline or diesel as fuel.

Such hydrogen is distributed and stored in a liquefied state, and the hydrogen of the liquefied state is stored in a cryogenic state so that a cryogenic fluid, such as liquefied hydrogen, is stored in the storage tank. It is necessary to properly supply the cryogenic fluid to a predetermined object to supply, for instance, a fuel cell or a hydrogen vehicle.

In addition to liquefied hydrogen, various kinds of gases, such as nitrogen, helium, natural gas, etc., are liquefied at an extremely low temperature and stored in a storage tank for transportation and storage. A general storage tank for storing cryogenic fluid is illustrated in FIGS. 1A and 1B.

Referring to FIGS. 1A and 1B, a storage tank 10 for storing cryogenic fluid includes an inner tank 11 in which a cryogenic fluid is stored, and an outer tank 12 formed to surround the inner tank 11 while being spaced apart from the inner tank 11 at a predetermined distance, wherein a space between the inner tank 11 and the outer tank 12 maintains in a vacuum state for heat insulation.

In this instance, in order to maintain a gap between the inner tank 11 and the outer tank 12, at least one connection unit 13 connecting the inner tank 11 and the outer tank 12 with each other may be provided.

As illustrated in FIGS. 1A and 1B, the connection unit 13 is coupled to the outer wall of the inner tank 11 and the inner wall of the outer tank 12 to prevent the inner tank 11 from directly getting in contact with the inside of the outer tank 12 and to maintain the shape of the storage tank 10.

The connection unit 13 is generally formed of a material having a low thermal conductivity so that the external heat is not transferred into the inner tank 11 or the cold air of the cryogenic fluid stored in the inner tank 11 is not conducted to the outside. However, since the connection unit 13 is basically formed has a cylindrical column shape and thus cannot completely block the thermal conduction, the storage efficiency and stability of the cryogenic fluid may be deteriorated due to thermal conduction through the connection unit 13.

For example, if a cryogenic fluid is actually stored in the storage tank 10, it can be easily seen that the outside of the outer tank 12 is covered with frost at a location where the connection unit 13 is formed, due to the low temperature of the cryogenic fluid stored in the inner tank 11.

When the thermal conduction through the connection unit 13 is easily performed, boil-off gas is generated due to vaporization of the stored cryogenic fluid, and it increases the risk of explosion and deteriorates the storage efficiency of the cryogenic fluid.

Accordingly, there is a need to suppress thermal conduction through the connection unit 13 connecting the inner tank 11 and the outer tank 12 of the storage tank 10.

SUMMARY OF THE INVENTION

Devices constructed according to inventive concepts consistent with embodiments of the invention are capable of suppressing thermal conduction through a connection unit that connects an inner tank and an outer tank of a storage tank.

Additional features of the inventive concepts will be set forth in the description that follows, and in part will be apparent from the description, or may be learned by practice of the inventive concepts.

It is to be understood that both the foregoing general description and the following detailed description are illustrative and explanatory and are intended to provide further explanation of the invention as claimed.

Accordingly, embodiments consistent with inventive concepts consistent with the invention provide for extending a thermal conduction path and suppressing thermal conduction as much as possible through an efficient connection structure between an inner tank and an outer tank of a storage tank in which a cryogenic fluid is stored.

To accomplish the inventive concepts, according to an embodiment, there is provided a support system for an inner and outer tank connection unit of a cryogenic fluid storage tank, the supporting system including: an inner support formed to surround a part of the connection unit; a head coupled to the inner circumferential surface of a first end portion of the inner support, and formed to come in contact with an end portion of the connection unit; and an outer support formed to surround the inner support and having a first end portion connected to the other end portion of the inner support, wherein a second end portion of the outer support comes in contact with the inner tank or the outer tank.

Moreover, the inner support may include a support part formed at the other end portion thereof to protrude a predetermined length toward the opposite direction to the connection unit, and the outer support may have one end connected with the inner support through the support part.

Furthermore, the inner support may be spaced apart from the outer circumferential surface of the connection unit at a predetermined interval so that the inner surface does not come in contact with the outer circumferential surface of the connection unit, and the outer support may be connected to the inner support such that the inner surface is spaced apart from the outer surface of the inner support by a predetermined distance.

Additionally, at least one among the inner support or the outer support may have a plurality of holes formed in the side surface.

In addition, the plurality of holes may be formed to have the same size and uniform intervals.

In another embodiment, there is provided a support system for a connection unit for connecting an inner tank and an outer tank of a cryogenic fluid storage tank, the supporting system including: an inner support including a head formed on the inner circumferential surface of a predetermined position so that an end portion of the connection unit comes in contact with the head when the connection unit is coupled, and being formed to surround a part of the connection unit; and an outer support formed to surround the inner support and having a first end portion connected to the inner support, wherein a second end portion of the outer support comes in contact with the inner tank or the outer tank.

In a further embodiment, there is provided a support system for a connection unit for connecting an inner tank and an outer tank of a cryogenic fluid storage tank, the supporting system including: a first support system disposed at one side of the connection unit; and a second support system disposed at the other side of the connection unit, wherein at least one of the first support system and the second support system includes: an inner support formed to surround a part of the connection unit; a head coupled to the inner circumferential surface of a first end portion of the inner support, and formed to come in contact with an end portion of the connection unit when the connection unit is coupled to the inner support; and an outer support formed to surround the inner support and having a first end portion connected to a second end portion of the inner support, wherein a second end portion of the outer support comes in contact with the inner tank or the outer tank.

In a still further embodiment, there is provided a cryogenic fluid storage tank including: an inner tank in which a cryogenic fluid is stored; an outer tank formed to surround the inner tank with a predetermined interval, at least one connection unit connecting the inner tank and the outer tank with each other; and a support system disposed on the connection unit, wherein the support system includes: an inner support formed to surround a part of the connection unit; a head coupled to the inner circumferential surface of a first end portion of the inner support, and formed to come in contact with an end portion of the connection unit when the connection unit is coupled to the inner support; and an outer support formed to surround the inner support and having a first end portion connected to a second end portion of the inner support, wherein a second end portion of the outer support comes in contact with the inner tank or the outer tank.

According to an embodiment, the support system may be provided on the connection unit connecting the inner tank and the outer tank with each other in the storage tank, in which a cryogenic fluid is stored, so as to increase the thermal conduction path without affecting the connection strength between the inner tank and the outer tank, thereby suppressing thermal conduction through the connection unit.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

The above and other objects, features and advantages of the present invention will be apparent from the following detailed description of the preferred embodiments of the invention in conjunction with the accompanying drawings, in which.

DETAILED DESCRIPTION

Figure 1A:
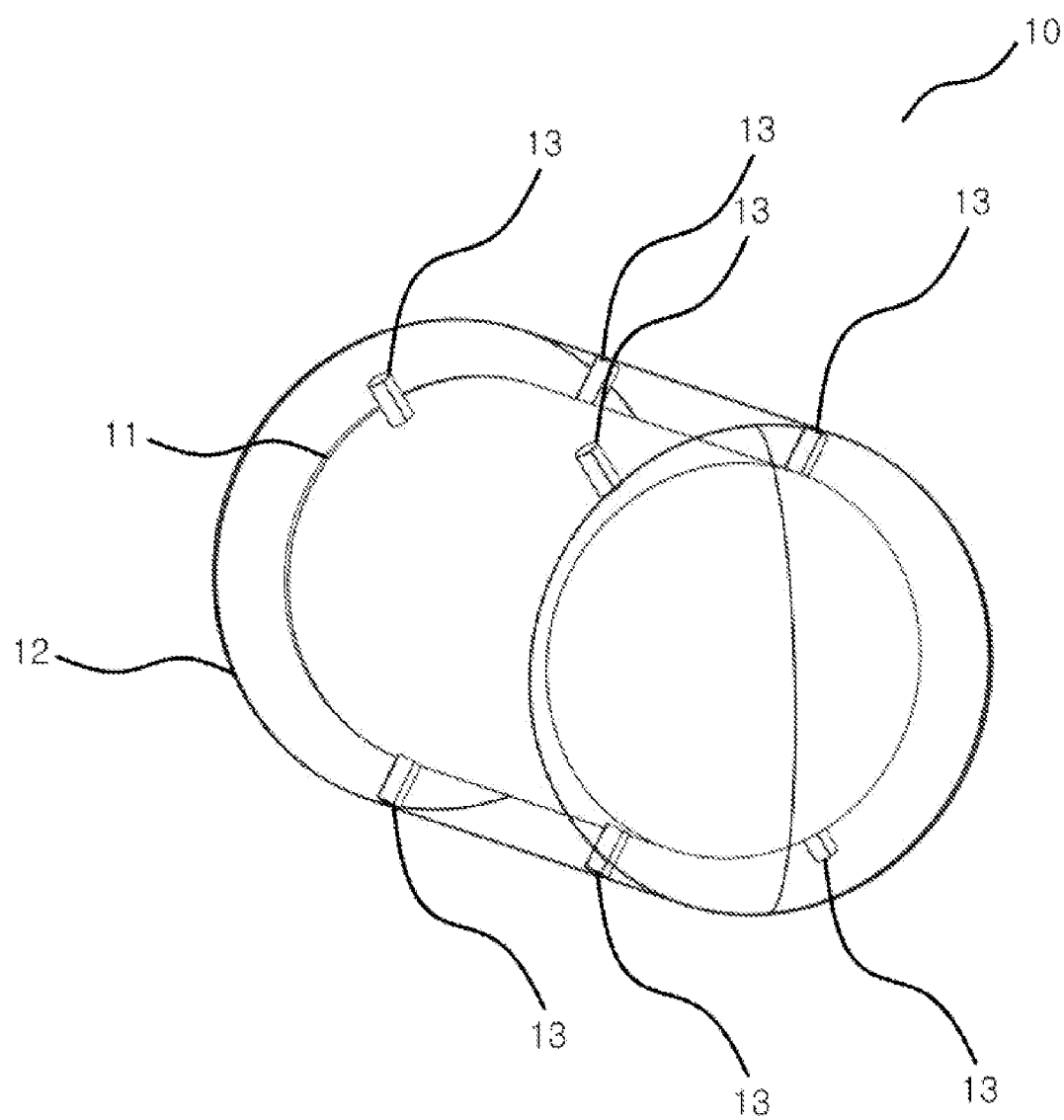
FIGS. 1A and 1B are respective a perspective view and a front view illustrating a conventional cryogenic fluid storage tank.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the present disclosure will be described with reference to the attached drawings. Like reference numerals in the drawings denote like elements.

Figure 2:
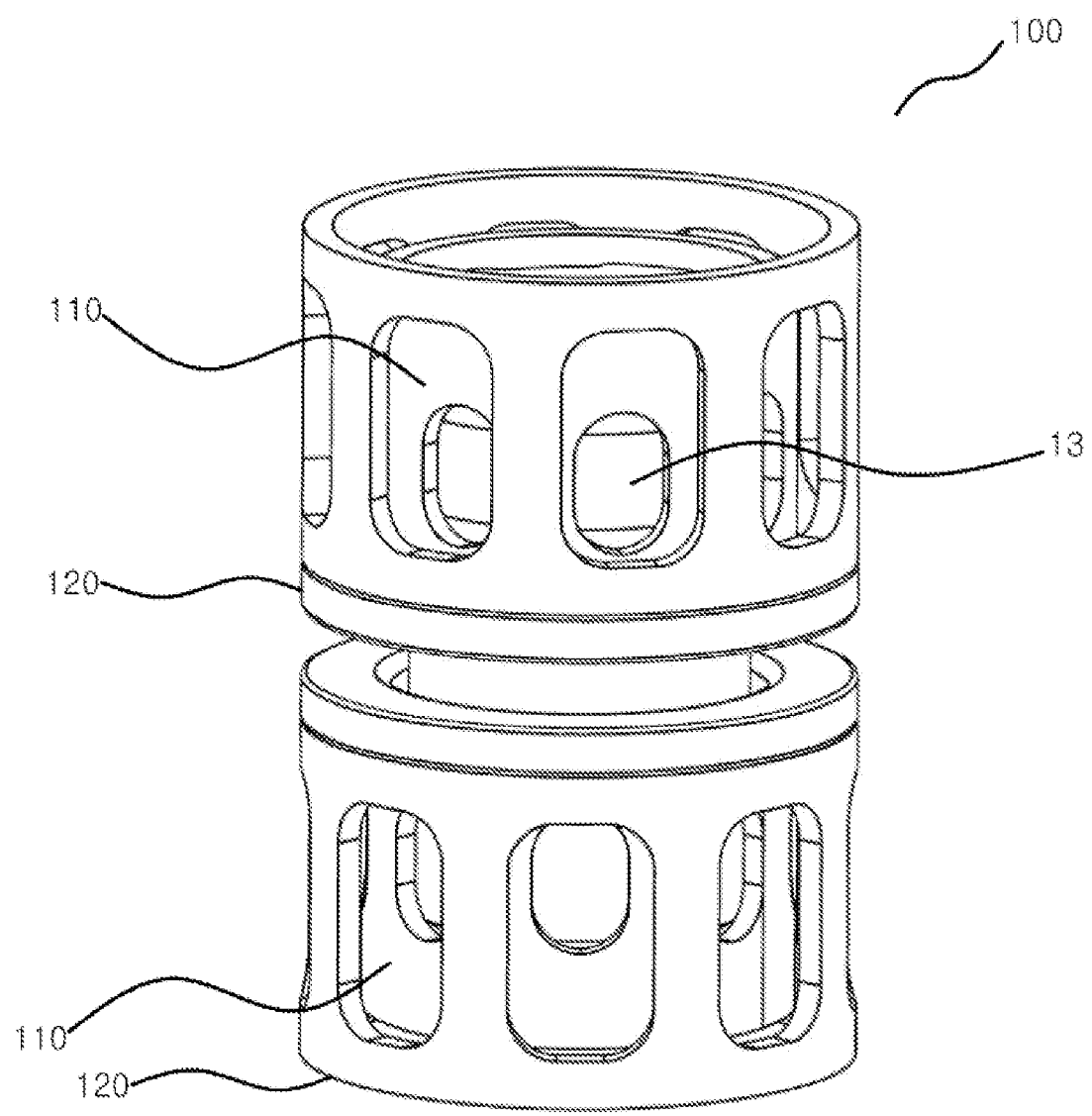
FIG. 2 is a schematic diagram of a support system for an inner and outer tank connection unit of a cryogenic fluid storage tank according to an embodiment that is constructed according to principles of the invention.
Figure 3:
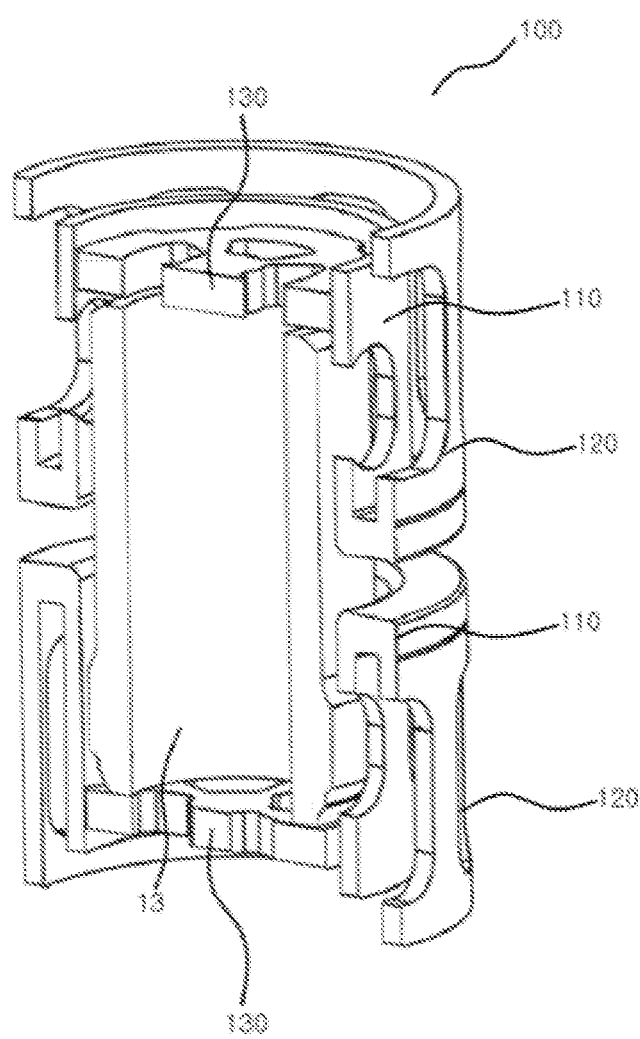
FIG. 3 illustrates a cross section of a support system for an inner and outer tank connection unit of a cryogenic fluid storage tank according to an embodiment.

FIG. 2 is a schematic diagram of a support system for an inner and outer tank connection unit of a cryogenic fluid storage tank according to an embodiment that is constructed according to principles of the invention, and FIG. 3 illustrates a cross section of a support system for an inner and outer tank connection unit of a cryogenic fluid storage tank according to an embodiment.

Referring to FIGS. 2 and 3, the support system 100 for an inner and outer tank connection unit of a cryogenic fluid storage tank according to the embodiment (hereinafter, referred to as a support system) includes: an inner support 110 formed to surround a part of a connection unit 13 that connects an inner tank 11 and an outer tank 12 of a storage tank 10 in which a cryogenic fluid is stored; a head 130 coupled to the inner circumferential surface of an end portion of the inner support 110, and formed to get in contact with an end portion of the connection unit 13 when the connection unit 13 is coupled to the inner support 110; and/or an outer support 120 formed to surround the inner support 110 and having an end portion connected to the other end portion of the inner support 110.

Figure 4:
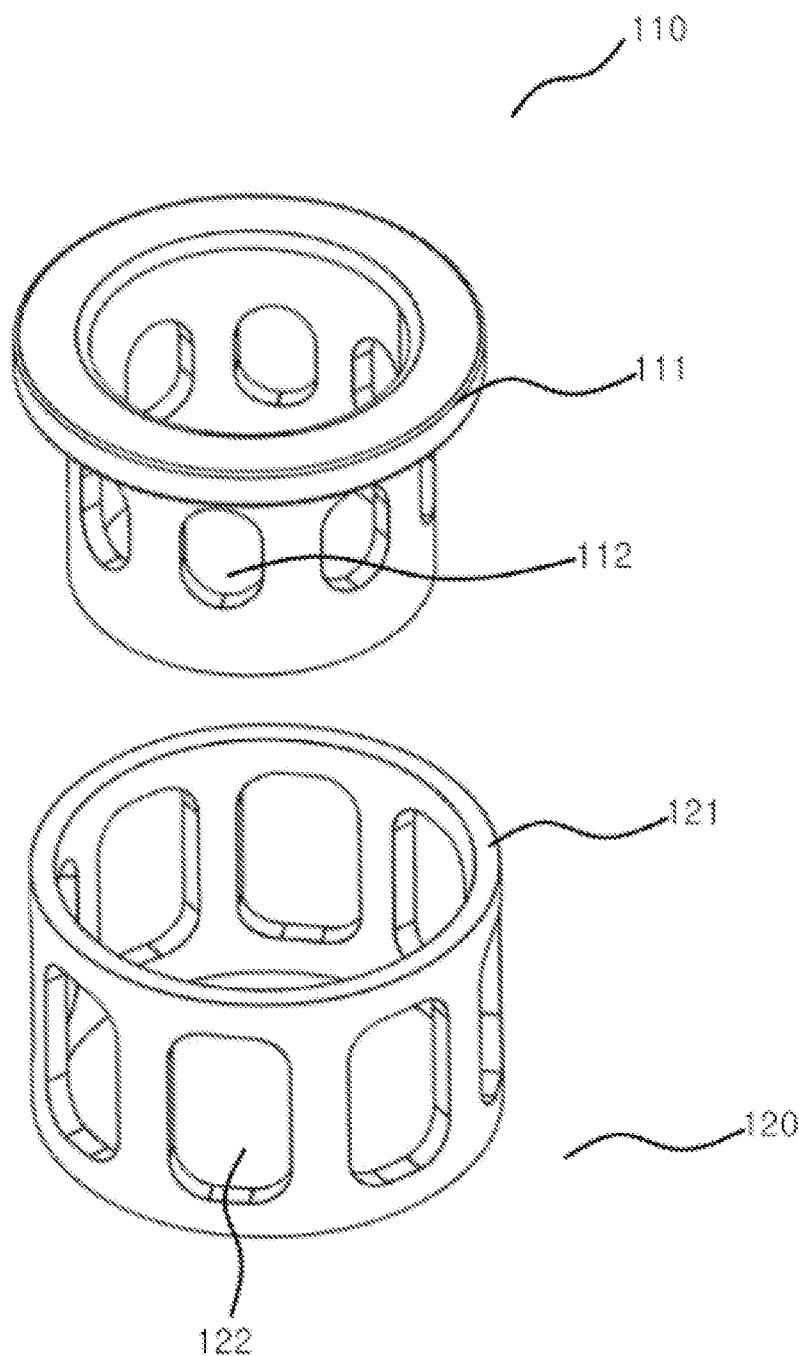
FIG. 4 is a view illustrating an inner support and an outer support of a support system for an inner and outer tank connection unit of a cryogenic fluid storage tank according to an embodiment.

In this instance, with reference also to FIG. 4, the inner support 110 may include a support part 111 formed at the other end portion thereof, namely, an end portion opposed to the end portion where the head 130 is located, to protrude a predetermined length toward the opposite direction to the connection unit 13. In addition, one end portion of the outer support 120 may be connected through the support unit 111.

In addition, the head 130 may be formed separately from the inner support 110 to be coupled to the inner circumferential surface of one end of the inner support 110 as described above, but according to an embodiment, the head 130 may be formed integrally with the inner support 110. In any case, when the head 130 is coupled to the inner support 110, the head 130 comes into contact with the end portion of the connection unit 13 to receive heat through the connection unit 13 or to support the connection unit 13 to prevent the connection unit 13 from being separated from the support system 100.

The term of an "end portion" can be used in a sense that covers a predetermined range from a tip end of a component having a predetermined length, for instance, the connection unit 13, the inner support 110, the outer support 120, etc. For example, one end portion of the inner support 110 may denote a predetermined range from one end of the inner support 110 toward a central portion in a longitudinal direction.

The connection unit 13 is generally made of a G-10 material. G-10 is high-pressure glass fiber laminate, which is a kind of composite material, and may be used as a material for the connection unit 13 for connecting the inner tank and the outer tank of the storage tank 10 since having low thermal conductivity and sufficient strength. However, because G-10 cannot be directly welded to the storage tank 10, which is a metal material, is not directly welded to the storage tank 10 that is a metal material, the inner and outer tanks are conventionally connected through a fixing part disposed at both end portions of the connection unit 13, that is, the end portion of the outer wall of the inner tank 11 and the end portion of the inner wall of the outer tank 12.

However, such a conventional connecting method frequently causes problems since heat is conducted through the connection unit 13.

To solve these problems, according to an embodiment, the thermal conduction path may be extended through the connection unit 13 between the inner and outer tanks, thereby preventing the cold air of the inner tank 11 from being discharged to the outside in a short time or preventing external heat from reaching the inner tank 11 within a short time.

FIGS. 2 and 3 illustrate that support systems 100 according to an embodiment are respectively provided at the upper part and the lower part of the connection unit 13, but the connection unit 13 is not fixed in any particular direction, as described with reference to FIGS. 1A and 1B. Hereinafter, for convenience of explanation, one of the support systems 100 respectively disposed at the upper part and the lower part of the connection unit 13 will be described in detail hereinbelow, but it is understood that another support system 100 that is not described herein but that has similar features as descried herein may also perform the same function.

As described above, the support system 100 according to an embodiment includes an inner support 110, an outer support 120, and a head 130. To describe the structure of the components of the support system 100, reference is made to the cross-sectional view of FIG. 3.

Referring to FIG. 3 and FIG. 4, the support system 100 according to an embodiment includes: an inner support 110 formed to surround a part of the upper end portion of a connection unit 13 connecting an inner tank and an outer tank of a storage tank 10 (see, for example, storage tank 10 shown in FIGS. 1A and 1B) from the upper part in FIG. 3; a support part 111 formed to protrude from an end portion of the inner support 110 toward the outside, namely, in the opposite direction of the connection unit 13; and an outer support 120 having a first end portion 121 connected to the support part 111. A second end portion of the outer support 120 can be connected to an inner tank 11 or an outer tank 12. Moreover, when the connection unit 13 is coupled into the inner support 110, a head 130 coming in contact with the end portion of the connection unit 13 can be coupled to the inner circumferential surface of a first end portion of the inner support 110. The lower end portion of the connection unit 13 can be also implemented in the same manner as the structure of the upper end portion of the connection unit 13.

Furthermore, in the support system 100 according to an embodiment, only the outer support 120 can be implemented to get in direct contact with the inner tank 11 and/or the outer tank 12. In other words, among the components constituting the support system 100, other components such as the inner support 110 and/or the head 130 are not in contact with the inner tank 11 and/or the outer tank 12, and only the outer support 120 can be in contact with the inner tank 11 and/or the outer tank 12.

In an embodiment, side parts of the inner support 110 and the outer support 120 are formed to be spaced apart from each other at a predetermined interval not to be in contact with each other, except the connection through the support unit 111 to be described later in more detail.

As a result, if the side parts of the inner support 110 and the outer support 120 come into contact with each other in order to extend the conduction path of the heat through the support system 100 and the connection unit 13, since heat can be conducted through the contact part, the extension of the heat conduction path can be substantially insignificant.

Therefore, preferably, the side part of the inner support 100 is formed not come in contact with the outer circumferential surface of the connection unit 13 and the inner circumferential surface of the outer support 120.

FIG. 4 is a view illustrating the inner support and the outer support of the support system for the inner and outer tank connection unit of the cryogenic fluid storage tank according to an embodiment.

Figure 1B:
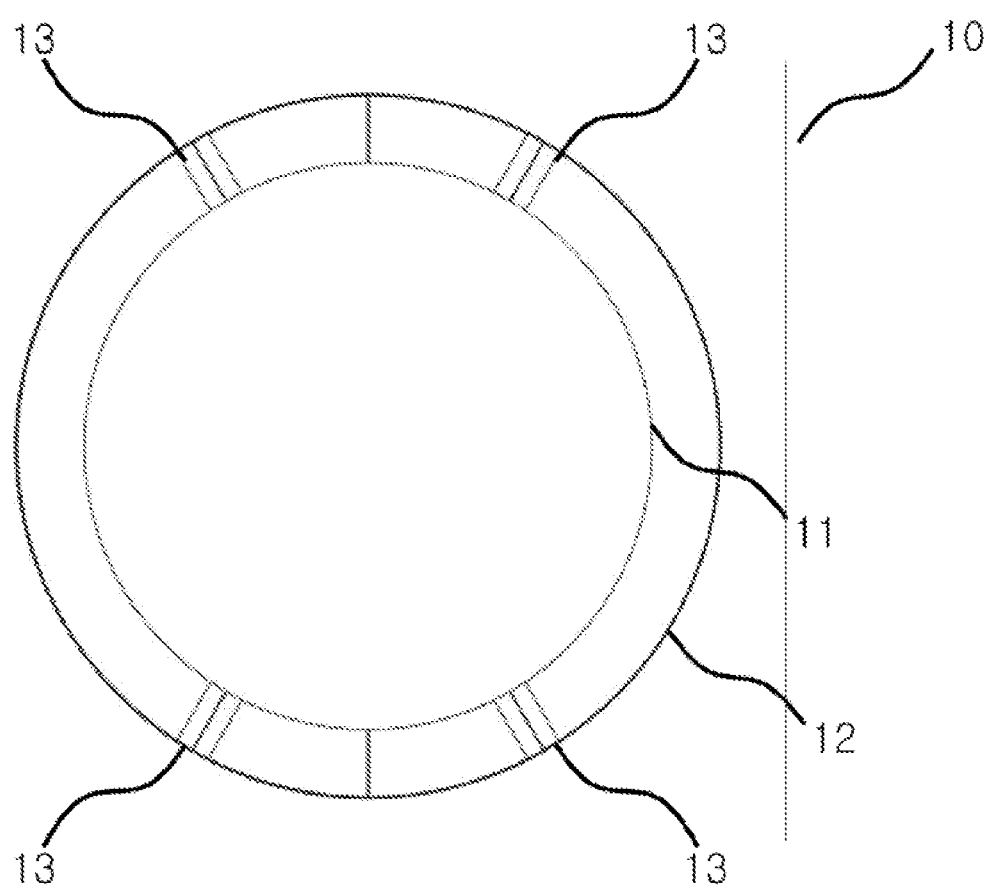

Referring to FIG. 4, the support system 100 for the inner and outer tank connection unit of the cryogenic fluid storage tank according to the embodiment includes: an inner support 110 formed to surround a part of an end portion of a connection unit 13 connecting inner and outer tanks, namely, an inner tank 11 and an outer tank 12 of a storage tank 10 in which a cryogenic fluid is stored (see, for example, storage tank 10 as shown in FIGS. 1A and 1B); and an outer support 120 formed to surround the inner support 110 and having an end portion connected to a support part 111 formed on the inner support 110.

According to an embodiment, a plurality of holes 112 and 122 may be formed in side parts of the inner support 110 and the outer support 120.

The plurality of holes 112 and 122 are operative to reduce a cross-sectional area in which heat will be conducted through the inner support 110 and the outer support 120.

However, since the support strength of the inner support 110 and the outer support 120 may get weak according to the size or the number of the holes 112 and 122, it is preferable that the plurality of holes 112 and 122 be formed to maintain support strength to support the connection between the inner tank 11 and the outer tank 12 and to reduce a cross-sectional area where heat will be conducted. In addition, for the same reason, it is preferable that the plurality of holes 112 and 122 be uniformly arranged in the same size.

Although eight holes 112 and 122 are uniformly formed in the inner support 110 and the outer support 120, the embodiment is not limited thereto, and it is natural that the plurality of holes 112 and 122 may be formed in various ways according to various conditions, such as material, volume, diameter, and required support strength, of the inner support 110 and the outer support 120.

Additionally, FIG. 4 illustrates that the plurality of holes 112 and 122 have a rectangular cross-section with the rounded corners, but it would be easily deduced by those skilled in the art that the plurality of holes 112 and 122 can also be formed in various shapes.

The inner support 110 and the outer support 120 illustrated in FIG. 4 are coupled to the lower side of the connection unit 13 vertically positioned on the ground. The inner support 110 and the outer support 120 coupled to the opposite side of the connection unit 13 can be formed in the same structure.

In other words, according to an embodiment, the support systems 100 are respectively provided at both ends of the connection unit 13, and consequently, two support systems 100 can be provided on one connection unit 13.

In the embodiment illustrated in the drawings, the support part 111 to which the upper end portion of the outer support 120 will be connected may be formed at one end portion of the inner support 110, that is, the upper end portion of the inner support 120.

Furthermore, although not illustrated in FIGS. 2-4, the head 130 may be coupled to the lower end of the inner support 110 along the inner circumferential surface of the inner support 110 so as to support the connection unit 13 coupled to the inner support 110.

When the connection unit 13 is coupled to the inner support 110, it is not necessary that the connection unit 13 and the inner support 110 come into close contact with or are fixed to each other.

According to an embodiment, the connection unit 13 and the inner support 110 may be closely attached or fixed to each other, but in an embodiment, the connection unit 13 can be coupled to the inner side of the inner support 110 in a sliding coupling form. In addition, it is illustrated that the connection unit 13 and the inner support 110 are in close contact with each other without an empty space. However, in some and perhaps most instances, a predetermined level of clearance may be generated between the connection unit 13 and the inner support 110.

Moreover, in one embodiment, the inner support 110, the outer support 120 and/or the head 130 may be formed of a metal material being capable of being welded with sufficient strength and having a relatively low thermal conductivity. For example, the inner support 110, the outer support 120, and the head 130 may be formed of a stainless material. In this case, the components can be connected to each other by welding, and the inner tank 11 and/or the outer tank 12 and the outer support 120 may be also coupled through welding. Of course, the inner support 110, the outer support 120, the head 130, and the storage tank 10 may be coupled in various ways depending on the properties or characteristics if they can be fixed and coupled with sufficient strength besides welding.

According to an embodiment, the inner support 110 may be formed such that the head 130 is integrally formed at one end portion of the head 130.

That is, the inner support 110 and the head 130 may be individually formed to be coupled to each other, but the head 130 may be integrally extended to the inner support 110 at a predetermined position of one end portion of the inner support 110. In any case, the head 130 can be formed to get in contact with an end portion of the connection unit 130 or to support an end portion of the connection unit 130 when the connection unit 13 is coupled to the inner support 110.

Figure 5:
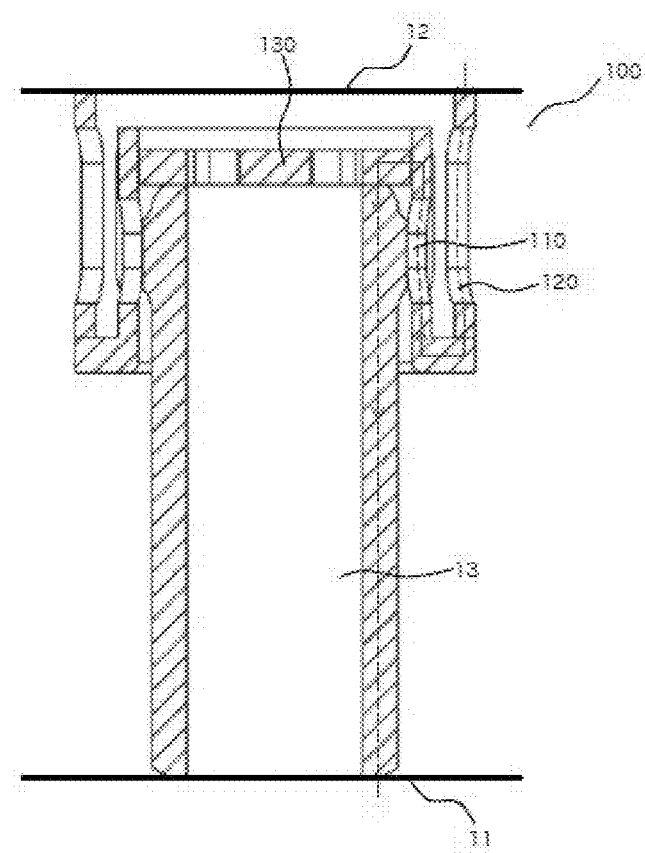
FIG. 5 is a view illustrating a thermal conduction path in the support system for the inner and outer tank connection unit of the cryogenic fluid storage tank according to an embodiment.

FIG. 5 is a view illustrating the thermal conduction path in the support system for the inner and outer tank connection unit of the cryogenic fluid storage tank according to an embodiment.

Referring to FIG. 5, in the support system 100 combined with the connection unit 13 as described above, it is assumed that the upper part of the structure shown in FIG. 5 is the outer tank 12.

When heat is conducted from the outside toward the inner tank 11, in the case of the conventional method, heat is directly conducted toward the inner tank 11. However, according to inventive concepts consistent with embodiments described herein, heat is first conducted through the outer support 120 connected to the outer tank 12, and then is conducted to the inner support 110 through the support part 111 of the inner support 110 connected to the outer support 120. In addition, the heat conducted along the inner support 110 can reach the connection unit 13 after passing through the head 130.

After that, when heat is conducted through the connection unit 13, the support system 100 coupled to the lower part of the connection unit 13 in the drawing extends the thermal conduction path again. In other words, the heat conducted to the connection unit 13 through the above-described process is conducted to the inner support 110 via the head 130 installed at the lower end of the connection unit 13, is conducted to the outer support 120 coupled through the support part 111 of the inner support 110, and then, is conducted to the inner tank 11.

That is, according to the embodiments described herein, since heat passes through the thermal conduction path not in the conventional straight path but in an S-shaped path, the thermal conduction path can get relatively longer within the same interval range. As described above, heat can be dissipated while being conducted along the relatively long thermal conduction path, thereby significantly reducing the influence on the cryogenic fluid stored in the inner tank 11.

Although the connection unit 13 with a cylindrical column shape is described with reference to the embodiments, other shapes of a connection unit beyond what is shown in FIGS. 1A, 1B, 2, 3 and 5, which may be used with a support system according to embodiment, are possible, since the inner support 110 is formed to surround a part of the connection unit when being coupled to the inner support 110, even in the case that the connection unit is formed to have a cross section of a polygonal shape, such as a triangle, a square, and the like, rather than the cross section of a circular shape.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A support system for a connection unit for connecting an inner tank and an outer tank of a cryogenic fluid storage tank, the supporting system comprising:
    an inner support formed to surround a part of the connection unit;
    a head coupled to the inner circumferential surface of a first end portion of the inner support, and formed to come in contact with an end portion of the connection unit; and
    an outer support formed to surround the inner support and having a first end portion connected to a second end portion of the inner support,
    wherein a second end portion of the outer support comes in contact with the inner tank or the outer tank.

2. The support system according to claim 1, wherein the inner support comprises a support part formed at the second end portion thereof to protrude a predetermined length toward the opposite direction to the connection unit, and
wherein the outer support has first end portion connected with the inner support through the support part.

3. The support system according to claim 1, wherein the inner support is spaced apart from the outer circumferential surface of the connection unit at a predetermined interval so that the inner surface is not in contact with the outer circumferential surface of the connection unit, and the outer support is connected to the inner support such that the inner surface is spaced apart from the outer surface of the inner support by a predetermined distance.

4. The support system according to claim 1, wherein at least one of the inner support or the outer support has a plurality of holes formed in a side surface thereof.

5. The support system according to claim 4, wherein the plurality of holes are formed to have a same size and are spaced apart from each other on the side surface of the side surface of the at least one of the inner support or the outer support at uniform intervals.

6. A support system for a connection unit for connecting an inner tank and an outer tank of a cryogenic fluid storage tank, the supporting system comprising:
a first support system disposed at one side of the connection unit; and
a second support system disposed at the other side of the connection unit,
wherein at least one of the first support system and the second support system comprises:
an inner support formed to surround a part of the connection unit;
a head coupled to the inner circumferential surface of a first end portion of the inner support, and formed to come in contact with an end portion of the connection unit when the connection unit is coupled to the inner support; and
an outer support formed to surround the inner support and having a first end portion connected to a second end portion of the inner support,
wherein a second end portion of the outer support comes in contact with the inner tank or the outer tank.

7. The support system according to claim 6, wherein the inner support comprises a support part formed at the second end portion thereof to protrude a predetermined length toward the opposite direction to the connection unit, and
wherein the outer support has first end portion connected with the inner support through the support part.

8. The support system according to claim 6, wherein the inner support is spaced apart from the outer circumferential surface of the connection unit at a predetermined interval so that the inner surface is not in contact with the outer circumferential surface of the connection unit, and the outer support is connected to the inner support such that the inner surface is spaced apart from the outer surface of the inner support by a predetermined distance.

9. The support system according to claim 6, wherein at least one of the inner support or the outer support has a plurality of holes formed in a side surface thereof.

10. The support system according to claim 9, wherein the plurality of holes are formed to have a same size and are spaced apart from each other on the side surface of the side surface of the at least one of the inner support or the outer support at uniform intervals.

11. A cryogenic fluid storage tank comprising:
an inner tank in which a cryogenic fluid is stored;
an outer tank formed to surround the inner tank with a predetermined interval;
at least one connection unit connecting the inner tank and the outer tank with each other; and
a support system disposed on the connection unit,
wherein the support system comprises:
an inner support formed to surround a part of the connection unit;
a head coupled to the inner circumferential surface of a first end portion of the inner support, and formed to come in contact with an end portion of the connection unit when the connection unit is coupled to the inner support; and
an outer support formed to surround the inner support and having a first end portion connected to a second end portion of the inner support,
wherein a second end portion of the outer support comes in contact with the inner tank or the outer tank.

12. The support system according to claim 11, wherein the inner support comprises a support part formed at the second end portion thereof to protrude a predetermined length toward the opposite direction to the connection unit, and
wherein the outer support has first end portion connected with the inner support through the support part.

13. The support system according to claim 11, wherein at least one of the inner support or the outer support has a plurality of holes formed in a side surface thereof.

14. The support system according to claim 13, wherein the plurality of holes are formed to have a same size and are spaced apart from each other on the side surface of the side surface of the at least one of the inner support or the outer support at uniform intervals.

* * * * *